United States Patent Office 3,421,008
Patented Jan. 7, 1969

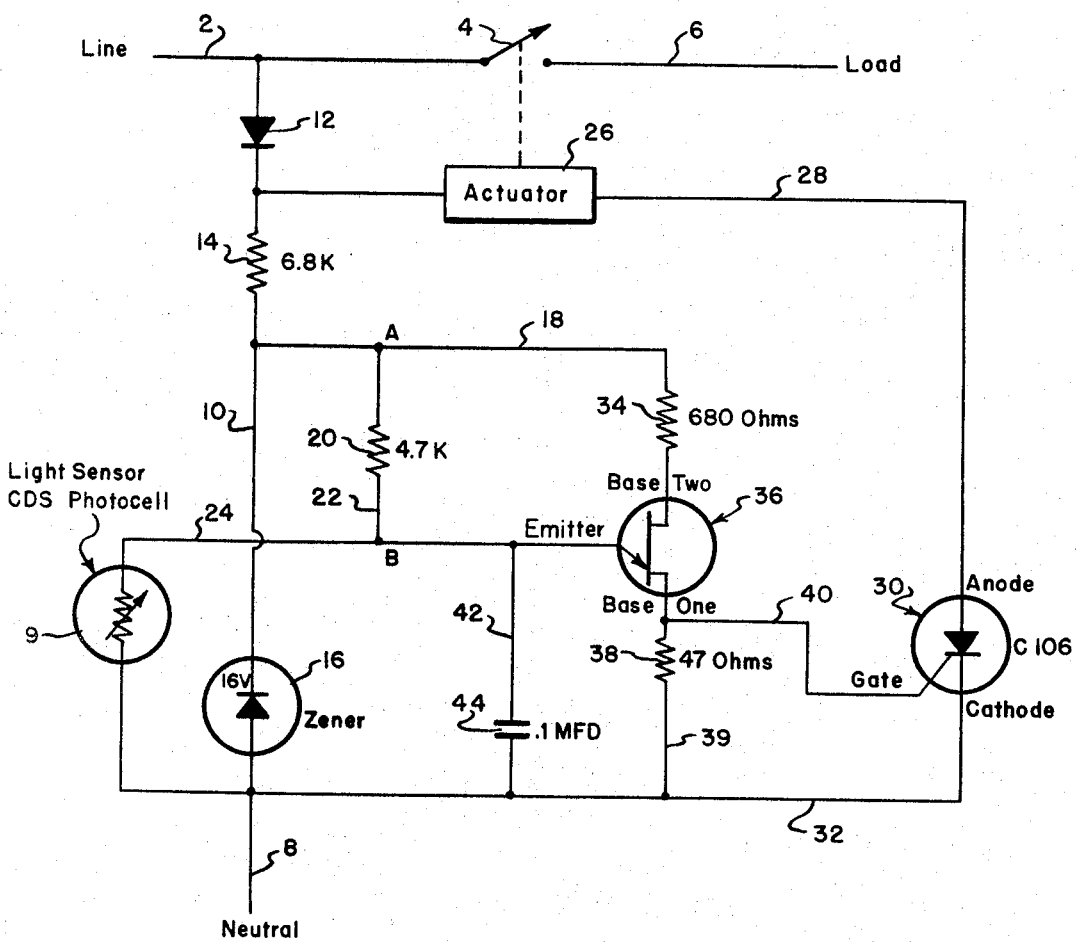

3,421,008
PHOTOELECTRIC CONTROL DEVICE FOR
STREET LIGHTS
Mark B. Shaw, Mount Vernon, N.Y., assignor to Tork Time Controls, Inc., Mount Vernon, N.Y., a corporation of New York
Filed July 13, 1966, Ser. No. 564,810
U.S. Cl. 250—214          8 Claims
Int. Cl. H01j 39/12

My invention relates to improvements in control devices for the operation of street lights and other loads, and more particularly my invention relates to improvements in photoelectrically controlled switching circuits for opening and closing load circuits in response to changes in ambient light conditions.

Known systems for switching on street lights at sundown or dusk and for turning them off at dawn involve the use of a load switch between a current supply line and a line to a street light or load, a relay connected into the current supply line for operating the load switch, and a light sensor for actuating the relay. During sunset, as the natural daylight decays, the resistance of the light sensor causes the relay to actuate the load switch which completes a current path from the supply line to the light or load, thus energizing the lighting circuit of the light.

Street light control devices of the above type are generally mounted on lamp posts adjacent to the lamps which are to be controlled. However, one difficulty encountered is that the control devices are sensitive to voltage conditions as well as to ambient light conditions and the lighting circuits to which the control devices are normally connected are usually, by their nature, not maintained at stable voltage. That is, when a photocontrol device operates to turn on a light at sunset, for example, it is frequently at a time of day when the power demand is changing rapidly. Therefore, over and under voltage conditions are common in this type of street lighting circuits.

When an above normal voltage condition occurs, the photocontrolled devices now in use apparently turn on the street lights at a lower foot-candle value of ambient light than that for which the devices were calibrated. Under these conditions the street lighting control devices may seem to fail, because the higher than normal voltage condition causes a decrease in the foot-candle turn-on level to a point where they will not turn on at night.

On the other hand, when a lower than normal voltage condition occurs, these photocontrolled devices turn on the lights at a higher foot-candle value during dusk or sunset. Existing control devices, therefore, have the drawback that they cause wastage of electricity by turning on the lights too early under lower than normal voltage conditions.

In some instances photocontrolled devices for street lights are deliberately designed to operate at completely different line voltages. These so-called multivoltage controls are sometimes designed to operate at any voltages between 105 and 480. Controls which are designed for these purposes usually result in changes in the light level at which the control responds.

Another difficulty encountered with conventional control devices is that they are temperature sensitive with respect to the ambient light turn-on level. Such devices, therefore, must be set higher than would be normally required so that they will be operable at any ambient temperature to which the controller might be subjected. Here again a control which must be set high because of its temperature sensitivity results in wasting electricity.

Most conventional controls calibrated to turn street lights on during sunset at a given light level will turn the lights off in the morning but at a higher light level. In some instances this fault is inherent in the design of the photocontrol mechanism and is one of the faults overcome by the photocontrol system of the present invention. An ideal control device would turn on and off at approximately the same foot-candle value and would result in a considerable saving of power, and money, which even for a medium sized city would amount to a sizable sum.

Another difficulty encountered with some of the present photoelectric control devices is that they are extremely difficult to calibrate for a specific foot-candle light value where they have to respond to a slow natural decay of light during sunset. In these controls, subject to this slow natural decay of light, calibration to a given foot-candle value without contact dither or stutter is very difficult.

Therefore, the primary object of the present invention is to provide a photoelectric control device or system which will avoid the difficulties described above and solve the resulting problems involved in photoelectrically turning lights on and off.

A further object of the invention is to provide a photoelectric control system which will turn lights on during sunset and off during sunrise at approximately the same foot-candle light value.

Another object of the invention is to provide a control switching system for street lights or other loads which can be accurately calibrated when installed and which will stay at this calibration regardless of the influence of changes in line voltage and ambient operating temperatures.

In accordance with the invention the improved photoelectric control system comprises a solid state triggering circuit responsive to a light sensor or photoelectric cell for actuating a load switch in an electric line leading to a street light or other load. More particularly, the system includes a load switching means combined with a solid state triggering circuit and a photoconductive cell. The solid state triggering circuit has the unique advantage that it can be used with all types of relays such as magnetic, reed, thermal and solid state devices as the load switch.

The invention is described more in detail hereinafter in connection with the attached drawing in which the single figure is a schematic or circuit diagram of one embodiment of the invention, the circuit being shown in the unoperated condition as it would be during daylight hours or periods of high intensity of illumination incident on the light sensor.

Referring to the drawing, certain parts are conventional in known types of lighting control circuits, for example, the current supply line terminal 2 the load switch 4 connecting it with a light or load terminal 6, and a neutral line terminal 8 which is connected into a photocell 9 from a line 10, containing certain elements and other connections, and which is connected through to the current supply line terminal 2. Since the load switch 4 is shown in open position, the street light or other standard lighting circuit to which the load terminal 6 is connected will be unenergized.

The alternating current supply in the line terminal 2 is rectified in the line 10 by a small diode 12 to a half-wave direct current. A resistor 14 in the line 10 and a Zener diode 16 in that line form a regulation voltage divider supply circuit to the triggering circuit of the system. This provides at point A of a lead 18 which is connected into the line 10 between the resistor 14 and the diode 16, a half-wave 50% duty cycle 16 v. waveform. This supply is divided between a resistor 20 in a lead 22 and the light sensor 9 connected in a lead 24 leading from the neutral terminal 8. The lead 22 connects the point A with a point B in the lead 24 and the potential at this point will be dependent upon the ratio of the light sensor's resistance to the resistance of the resistor 20, with a 16 v. supply with respect to the neutral terminal 8.

During natural daylight hours, or when a high ambient light is incident on the photocell 9, point B, with respect to neutral, will have a small positive voltage. As the natural light decays or the light incident on the photocell 9 decreases, the resistance of the photoconductive cell 9 will increase, thus point B in the lead 24, connected into the photocell 9, will be more positive with respect to the neutral terminal 8.

The overall circuit arrangement shown in the drawing includes a control system for actuating the load switch 4 comprising an actuator 26 which may be of known type or as indicated above, this actuator being located in a lead 28 connected into the line 10 between the diode 12 and the resistor 14. The control system also comprises a silicon controlled rectifier 30 to the anode of which the lead 28 is connected. The cathode of the rectifier 30 is connected through a lead 32 into the neutral line terminal 8 outside the diode 16, the same as the photocell 9.

The control circuit includes a unijunction transistor voltage divider circuit connected into the rectifier 30, comprising a resistor 34 located in the lead 18, a unijunction transistor 36 and a resistor 38, in a lead 39 connected into lead 32, and shunted by a lead 40 and the gate to the cathode impedance of the silicon controlled rectifier 30. This voltage divider circuit represents a high impedance of the flow of electrons, as long as the emitter peak potential at the point B is below the peak potential necessary to cause the transistor 36 to conduct or present a low impedance in its base one circuit, connected into the gate and the resistance 38.

The emitter of the unijunction transistor 36 is connected into the lead 24 extending from the point B, and a lead 42, having therein a capacitor 44 is connected into the lead 24 between the emitter and the point B and into the lead 32 between the lead 39 and the neutral line 8. This capacitor acts as a voltage divider and differentiator for the emitter circuit of the unijunction transistor 36. As the natural light decays, such as at sunset, or the illumination incident on the photocell 9 decreases, point B in the lead 24 will have a higher positive potential with respect to the neutral line terminal 8.

The drawing indicates the preferred values for the different resistances and the capacitor 44. The diode 16 is a Zener diode receiving 16 volts in the lead 10 as indicated. The unijunction transistor 36 has "base one" contact or lead connected to the resistor 38 and a "base two" contact or lead connected to the resistor 34.

The drawing shows the condition of the operating circuit during natural daylight with the switch 4 open. During this time when a high level of illumination is incident on the photocell 9 the capacitor 44 or thus point B will not reach a high positive potential with respect to the neutral terminal 8 due to the charging time of the capacitor 44. As soon as the phase of the current supply line 2 reverses, the capacitor 44 will discharge. When point B becomes more positive with respect to the neutral terminal 8 than the peak point potential of the emitter of the unijunction transistor, the transistor will present a low impedance between its emitter and its base one contact, thus discharging the potential developed on the 0.1-microfarad capacitor 44 through the emitter of the transistor 36, its base one contact and through the 47-ohm resistor 38, and thereby providing a high instantaneous peak positive potential to the gate of the silicon controlled rectifier 30. This high peak positive potential on the gate of the rectifier 30 will enable this rectifier to conduct.

The circuit comprising the diode 12, the actuator 4, the silicon controlled rectifier 30, anode to cathode, to neutral is the load switch actuating control system. In this system the rectifier 30 presents a high impedance path in both directions as long as there does not exist a high positive peak point potential on its gate. Therefore, when a positive peak potential is present on the gate of the rectifier 30, current is permitted to flow through this rectifier, presenting a low impedance path for the flow of electrons, which causes the actuator 26 to have a voltage across it. The actuator 26 is arranged so that when a voltage is conducted across it, it will close the switch 4 and complete the circuit from the current supply line terminal 2 to the load terminal 6.

As long as the photocell 9 has a low value of illumination incident on it, the transistor 36 will continue to fire every half cycle of supply line frequency, thus permitting the silicon controlled rectifier 30 to fire every half cycle of the supply line frequency, thus supplying power to the actuator 26 every half cycle of the supply line frequency, which in turn keeps the switch 4 closed and completes the circuit from the terminal 2 to the terminal 6. If the value of the illumination incident on the light sensor 9 increases to a higher foot-candle value, then point B will be less positive, which will not permit the transistor 36 to fire, thereby preventing the development of a voltage across the actuator 26 which will open the switch 4 and cut the current flow to the load terminal 6.

When the system according to the present invention and shown on the drawing is utilized in a street lighting circuit and it is subjected to a low supply voltage, the characteristic resistance of the Zener diode 16 will increase in proportion to the decrease in supply voltage, thus keeping 16 volts across the circuit from point A to the neutral terminal 8. If the line supply voltage is increased, the impedance of the Zener diode 16 will decrease thus keeping the 16 v. from point A to the neutral terminal 8. In all cases the amount of the supply voltage which is greater than this value will appear across 6.8 K resistor 14.

The unijunction voltage divider circuit including the unijunction transistor 36 and resistor 34 is arranged to react in response to changes in the ambient temperature to which the control device is subjected. For example, the 680-ohm resistor 34 was chosen and provided so that as the ambient temperature changes, the impedance of the transistor 36 also changes so that the peak point voltage on its emitter will approximate the same as the potential that was necessary to trigger the device when the unit was calibrated. The device and control circuit of the present invention has an inherent sensitivity and snap action controlling voltage to the actuating device 26, and because of this the unit has a low control ratio, i.e., the foot-candle value to turn it ON or actuate the switch 4 will approximate the foot-candle value to turn the device OFF.

What I claim is:

1. In a photoelectrically controlled system for street lights and other loads including a load switching means for opening and closing a circuit from a current supply line to a load terminal in response to changes in ambient light conditions, in which said switching means includes an actuator located in a triggering circuit connected into and responsive to a light sensor, the improvement comprising a diode connected between the current supply line and the actuator, a controlled rectifier connected anode-to-cathode from said actuator into a neutral line, and a solid state unijunction transistor connected through a resistance to the output of said diode and into the gate of said rectifier.

2. A system as claimed in claim 1, in which the current supply line is an alternating current supply and the diode rectifies the alternating current to a half-wave direct current, means for supplying said half-wave direct current from said diode through a resistor connected into a Zener diode thereby providing a regulation voltage divider supply circuit to the triggering circuit by connections to said unijunction transistor.

3. A control system as claimed in claim 1, in which the light sensor is located in a lead connected into the neutral line from one side and through said lead from the other side into the emitter of said unijunction transistor.

4. A system as claimed in claim 3, in which the base one contact of the unijunction transistor is connected through a resistance to the neutral line and in which said base one contact is shunted to the gate of the control rectifier.

5. A control system as claimed in claim 3, in which said diode is connected through a resistance into the lead extending from the light sensor to the emitter of the transistor.

6. A system as claimed in claim 1, in which the triggering circuit includes means cooperating with the unijunction transistor for providing a high instantaneous peak positive potential to the gate of the rectifier.

7. A system as claimed in claim 1, including a Zener diode connected anode-to-cathode from the neutral line through a resistance to said diode connected to the current supply line, said Zener diode being arranged to maintain a substantially constant voltage to the neutral line.

8. A system as claimed in claim 1, in which the base two contact of the unijunction transistor is connected through a resistance of approximately 680 ohms which in turn is connected to said diodes and the lead extending to the emitter, said unijunction transistor and resistance being so arranged in the circuit as to be responsive to changes in ambient temperatures.

References Cited

UNITED STATES PATENTS

| | | | |
|---|---|---|---|
| 3,176,189 | 3/1965 | Tabet | 307—311 X |
| 3,325,680 | 6/1967 | Amacher | 307—311 |
| 3,347,141 | 10/1967 | Nobusawa et al. | 250—206 X |

WALTER STOLWEIN, *Primary Examiner.*

U.S. Cl. X.R.

307—311